(12) United States Patent
Waltho et al.

(10) Patent No.: US 8,041,934 B2
(45) Date of Patent: Oct. 18, 2011

(54) TRANSMISSION DISTINGUISHING APPARATUS, SYSTEMS, AND METHODS

(75) Inventors: Alan E. Waltho, San Jose, CA (US); Jeffrey Schiffer, Palo Alto, CA (US)

(73) Assignee: Intel Corporation, Santa Clara, CA (US)

(*) Notice: Subject to any disclaimer, the term of this patent is extended or adjusted under 35 U.S.C. 154(b) by 2013 days.

(21) Appl. No.: 10/931,701

(22) Filed: Sep. 1, 2004

(65) Prior Publication Data

US 2006/0045208 A1    Mar. 2, 2006

(51) Int. Cl.
*G06F 9/00* (2006.01)
*G06F 12/14* (2006.01)
*H04L 29/06* (2006.01)
*H04N 7/16* (2011.01)
*H04N 7/167* (2011.01)

(52) U.S. Cl. .............. 713/2; 713/165; 713/189; 726/26; 380/201; 380/203; 380/210; 725/25; 725/31

(58) Field of Classification Search .............. 713/2, 165, 713/189; 726/26; 380/201, 203, 210; 725/25, 725/31
See application file for complete search history.

(56) References Cited

U.S. PATENT DOCUMENTS 5,731,848 A * 3/1998 Patel et al. .................... 348/614

* cited by examiner

*Primary Examiner* — Aravind Moorthy
(74) *Attorney, Agent, or Firm* — Schwegman, Lundberg & Woessner, P.A.

(57) ABSTRACT

Apparatus and systems, as well as methods and articles, may operate to distinguish between sources of signals transmitted with a pilot carrier based upon a variance in a peak-to-peak amplitude of a sum of a received pilot carrier and a delayed received pilot carrier.

17 Claims, 4 Drawing Sheets

Delay periods

TRANSMISSION DISTINGUISHING APPARATUS, SYSTEMS, AND METHODS

TECHNICAL FIELD

Various embodiments described herein relate to communications generally, including apparatus, systems, and methods used to transmit and receive information in the broadcast television spectrum.

BACKGROUND INFORMATION

Unlicensed use of the broadcast television spectrum by unlicensed communications devices (UCDs) on a non-interfering basis may be possible in various jurisdictions, since some of the video and data signals transmitted by UCDs may be formatted according to existing digital television standards. However, such ad hoc video and data signal transmissions from UCDs may be difficult to distinguish from each other, and/or from licensed (e.g., commercial) broadcasts. For more information regarding digital television standards, please see "ATSC Standard A/53 (1995): ATSC Digital Television Standard," Advanced Television Systems Committee, Washington, D.C., 1994, and amendments thereto.

DETAILED DESCRIPTION

Various embodiments disclosed herein address the challenge of distinguishing between licensed and unlicensed users of the broadcast television spectrum, since even unlicensed users may transmit a standard digital broadcast television signal format. For example, a method described below may utilize amplitude detection of a signal generated by the summation of a narrow-band pilot carrier and a delayed version of the pilot carrier to distinguish signals transmitted by licensed broadcasters from signals transmitted by unlicensed stations.

In some embodiments, an unlicensed station (e.g., an unlicensed communications device, possibly within a personal computer) may transmit a pilot carrier having substantially the same frequency as a pilot carrier transmitted by a commercial broadcast station. Whereas the commercial broadcast station may transmit a pilot carrier of constant phase, the unlicensed station may periodically invert the phase of its pilot carrier during transmission. A period of phase inversion may, for example, include an integer multiple of a time delay incorporated into a receiving device.

Thus, in some embodiments herein disclosed, a receiver may operate to discriminate between various transmitted pilot carriers by delaying a received pilot carrier and summing the received pilot carrier with the delayed, received pilot carrier. For example, a received commercial broadcast pilot carrier (having substantially constant phase) may sum additively with a delayed version of the received commercial pilot carrier to create a resultant of approximately double the amplitude of the commercial pilot carrier as received. On the other hand, a periodically phase-inverted unlicensed pilot carrier processed in the same way may subtractively combine with a delayed version of the unlicensed pilot carrier during periods of phase inversion and/or may additively combine during periods of non phase-inversion. The unlicensed resultant signal may therefore vary periodically between cancellation and additive summation.

In some embodiments, an unlicensed station may invert its pilot carrier with a periodicity distinct from that of other stations, to provide a mode of distinguishing between individual unlicensed stations and/or between classes of unlicensed stations. Two or more such stations may then be distinguished by noting differences in periodicities of cancellation of their resultant received signals after processing.

Figure 1A:
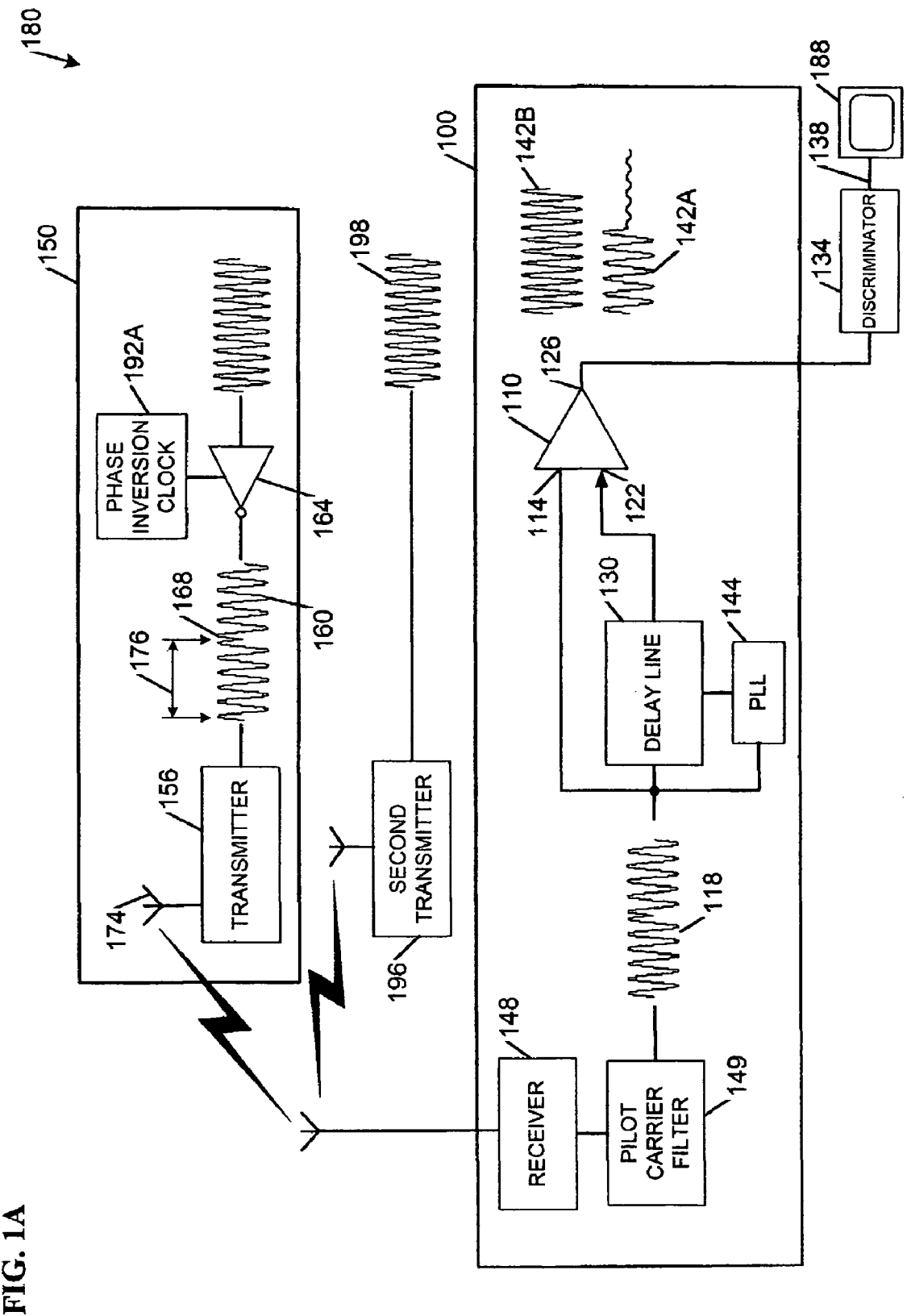
FIGS. 1A, 1B comprise a block diagram of apparatus and systems, as well as some signal waveforms, respectively, according to various embodiments of the invention.
Figure 1B:
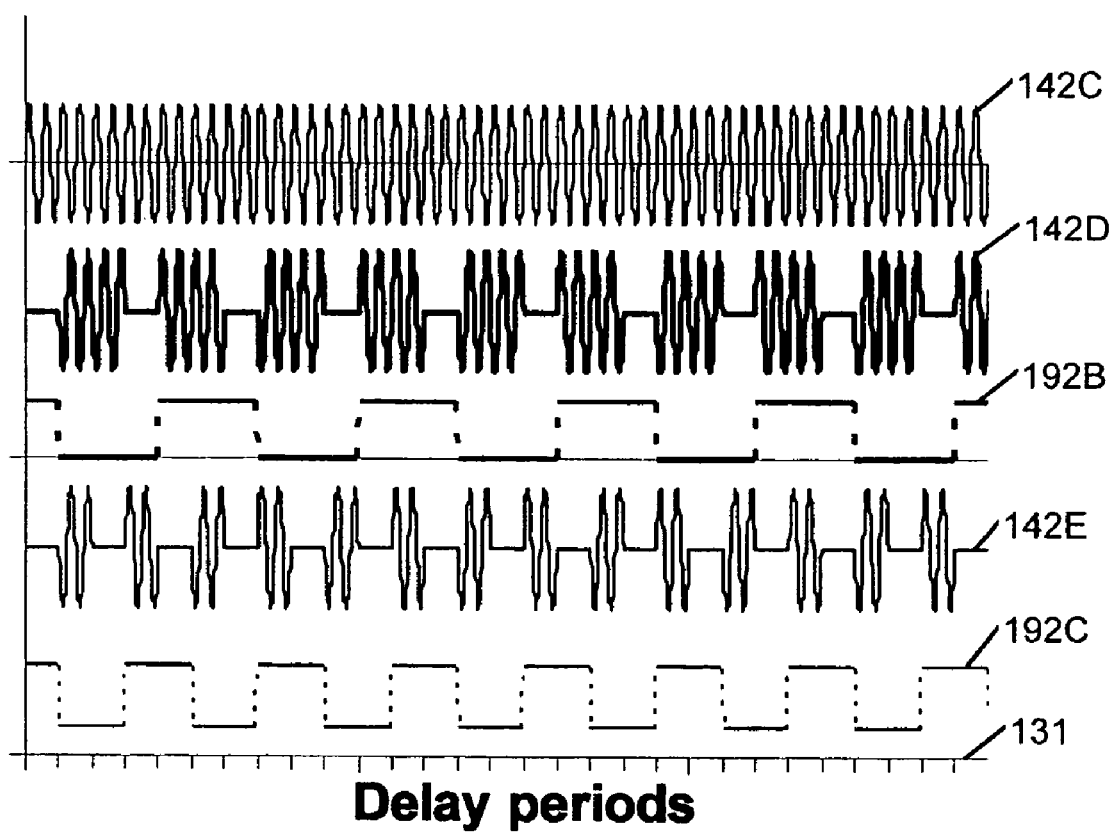

FIGS. 1A, 1B comprise a block diagram of apparatus 100, 150 and systems 180, as well as some signal waveforms, respectively, according to various embodiments of the invention, each of which may operate in the manner described above. The apparatus 100 may include a summation device 110 having a first summation input 114 to receive a pilot carrier signal 118, a second summation input 122, and/or a summation output 126. Some embodiments of the apparatus 100 may include a delay line 130 to receive the pilot carrier signal 118 and/or to be coupled to the second summation input 122 to delay the pilot carrier signal 118 by a delay period 131. In some embodiments of the apparatus 100, a discriminator 134 may coupled to the summation output 126 to provide a class-of-service indication 138. The discriminator 134 may, for example, distinguish between a licensed station and an unlicensed station based upon a periodic cancellation of a summed resultant signal 142A, 142B, 142C, 142D and/or 142E. It should be noted that resultant signals 142A, 142B, 142C, 142D and/or 142E are depicted as examples, and that other signal patterns may result from various combinations of transmitter phase inversion and receiver delay.

Some embodiments of the apparatus 100 may include a phase-locked loop (PLL) 144 coupled to the delay line 130 and/or to the pilot carrier signal 118. The PLL may act to match and/or limit the delay period to approximately an integral multiple of a reciprocal of a pilot carrier frequency (e.g., to phase-lock the delay function to the pilot carrier signal 118, perhaps to the frequency of the pilot carrier signal 118). Phase-locking the delay to the pilot carrier signal 118 may result in more complete cancellation and/or summation of the delayed pilot carrier signal and the undelayed pilot carrier signal 118 at the summation output 126.

Some embodiments of the apparatus 100 may also include a radio frequency (RF) receiver 148 to supply the pilot carrier signal 118, and/or a pilot carrier filter 149 coupled to the summation device 110 and/or to the delay line 130 to filter the pilot carrier signal 118. Thus, the pilot carrier signal 118 may be received in an unfiltered form.

In some embodiments, an apparatus 150 may include a transmitter 156 to transmit a periodically phase-inverted pilot carrier signal 160, and/or a phase inversion device 164 coupled to the transmitter 156 to periodically invert a phase 168 of the periodically phase-inverted pilot carrier signal 160. In some embodiments of the apparatus 150, a phase inversion period 176 of the phase inversion device 164 may comprise a programmable period. Some embodiments of the apparatus 150 may include an antenna 174 coupled to the transmitter 156. The antenna 174 may comprise a number of types, including patch, omnidirectional, beam, monopole, dipole, and/or log periodic antennas, among others.

A system 180 may include one or more apparatus 100 and/or one or more apparatus 150, described previously. In some embodiments of the system 180, a display 188 may be coupled to the discriminator 134 to display the class-of-service indication 138.

Thus, the system 180 may also include a transmitter 156 to transmit a periodically phase-inverted pilot carrier signal 160 to the receiver 148, and/or a phase inversion device 164 coupled to the transmitter 156 to periodically invert a phase 168 of the phase-inverted pilot carrier signal 160 according to a periodicity of phase inversion 176. The system 180 may further include a clock 192A, 192B, 192C coupled to the phase inversion device 164 to determine the periodicity of phase inversion 176. Many different clock 192A, 192B, 192C signal patterns may be employed. In some embodiments of the system 180, a second transmitter 196 may be coupled to the receiver 148 to transmit a non phase-inverted pilot carrier signal 198.

The apparatus 100; summation device 110; summation inputs 114, 122; pilot carrier signal 118; summation output 126; delay line 130; delay period 131; discriminator 134; class-of-service indication 138; summed resultant signals 142A, 142B, 142C, 142D, 142E; phase-locked loop 144; radio frequency (RF) receiver 148; pilot carrier filter 149; apparatus 150; transmitters 156, 196; periodically phase-inverted pilot carrier signal 160; phase inversion device 164; phase 168; antenna 174; phase inversion period 176; system 180; display 188; clocks 192A, 192B, 192C; and non phase-inverted pilot carrier signal 198 may all be characterized as "modules" herein.

Such modules may include hardware circuitry, processors, memory circuits, software program modules and objects, firmware, and/or combinations thereof, as desired by the architect of the apparatus 100, apparatus 150, and system 180, and as appropriate for particular implementations of various embodiments. For example, such modules may be included in a system operation simulation package, such as a software electrical signal simulation package, a power usage and distribution simulation package, a capacitance-inductance simulation package, a power/heat dissipation simulation package, a signal transmission-reception simulation package, and/or a combination of software and hardware used to simulate the operation of various potential embodiments.

It should also be understood that the apparatus and systems of various embodiments can be used in applications other than transmission and reception of television signals, and thus, various embodiments are not to be so limited. The illustrations of apparatus 100, apparatus 150, and system 180 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules, including multilayer, multi-chip modules. Such apparatus and systems may further be included as sub-components within a variety of electronic systems, such as televisions, cellular telephones, personal computers, workstations, radios, video players, vehicles, and others. Some embodiments include a number of methods.

Figure 2:
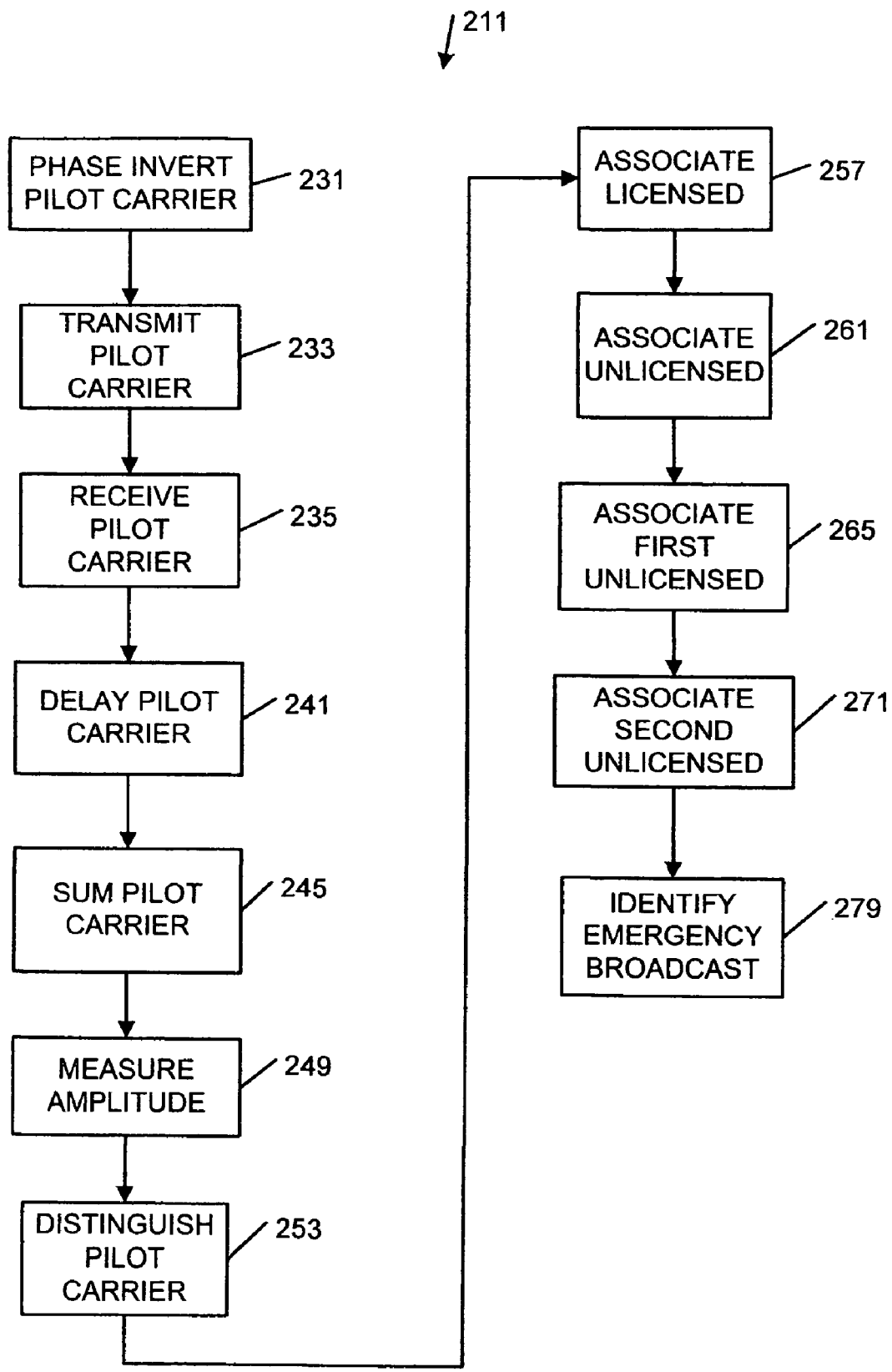
FIG. 2 is a flow diagram illustrating several methods according to various embodiments of the invention.

FIG. 2 is a flow diagram illustrating several methods 211 according to various embodiments of the invention. For example, a method 211 may (optionally) begin at block 231 with periodically phase-inverting a non phase-inverted pilot carrier signal according to a periodicity of phase inversion to create a phase inverted pilot carrier signal. The pilot carrier signal may comprise a spectral component of a digital television signal, perhaps a high definition television (HDTV) signal. The periodicity of phase inversion may comprise an approximate integral multiple of a delay period and/or an approximate integral factor of the delay period, among others. The method 211 may continue with transmitting the pilot carrier signal, possibly as radio frequency (RF) energy, at block 233.

The method 211 may include receiving the pilot carrier signal, possibly as RF energy at block 235, and/or delaying the pilot carrier signal according to the delay period to create a delayed pilot carrier signal at block 241. The delay period may include, for example, a period of approximately one millisecond. Other delay periods may be used, however. The method 211 may further include summing the pilot carrier signal and the delayed pilot carrier signal to create a summed pilot carrier signal at block 245, and/or measuring a peak-to-peak amplitude of the summed pilot carrier signal at least once during a period of measurement not greater than the periodicity of phase inversion at block 249.

The method 211 may continue at block 253 with distinguishing the pilot carrier signal (perhaps included in a plurality of pilot carrier signals) based upon a variance in a peak-to-peak amplitude of the summed pilot carrier signal. For example, the method 211 may include associating a licensed pilot carrier signal with the summed pilot carrier signal having an approximately constant peak-to-peak magnitude, at block 257. The method 211 may include associating an unlicensed pilot carrier signal with the summed pilot carrier signal having a substantially bi-level peak-to-peak magnitude at block 261.

The method 211 may also include distinguishing between different unlicensed pilot carrier signals by associating a first unlicensed pilot carrier signal with the summed pilot carrier signal having a substantially bi-level peak-to-peak magnitude of a first bi-level periodicity at block 265, and/or associating a second unlicensed pilot carrier signal with the summed pilot carrier signal having a substantially bi-level peak-to-peak magnitude of a second bi-level periodicity at block 271. The method 211 may then (optionally) terminate by identifying an emergency broadcast source at block 279.

It should be noted that the methods described herein do not have to be executed in the order described, or in any particular order. Moreover, various activities described with respect to the methods identified herein can be executed in repetitive, serial, or parallel fashion. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment. Thus, other embodiments may be realized.

Figure 3:
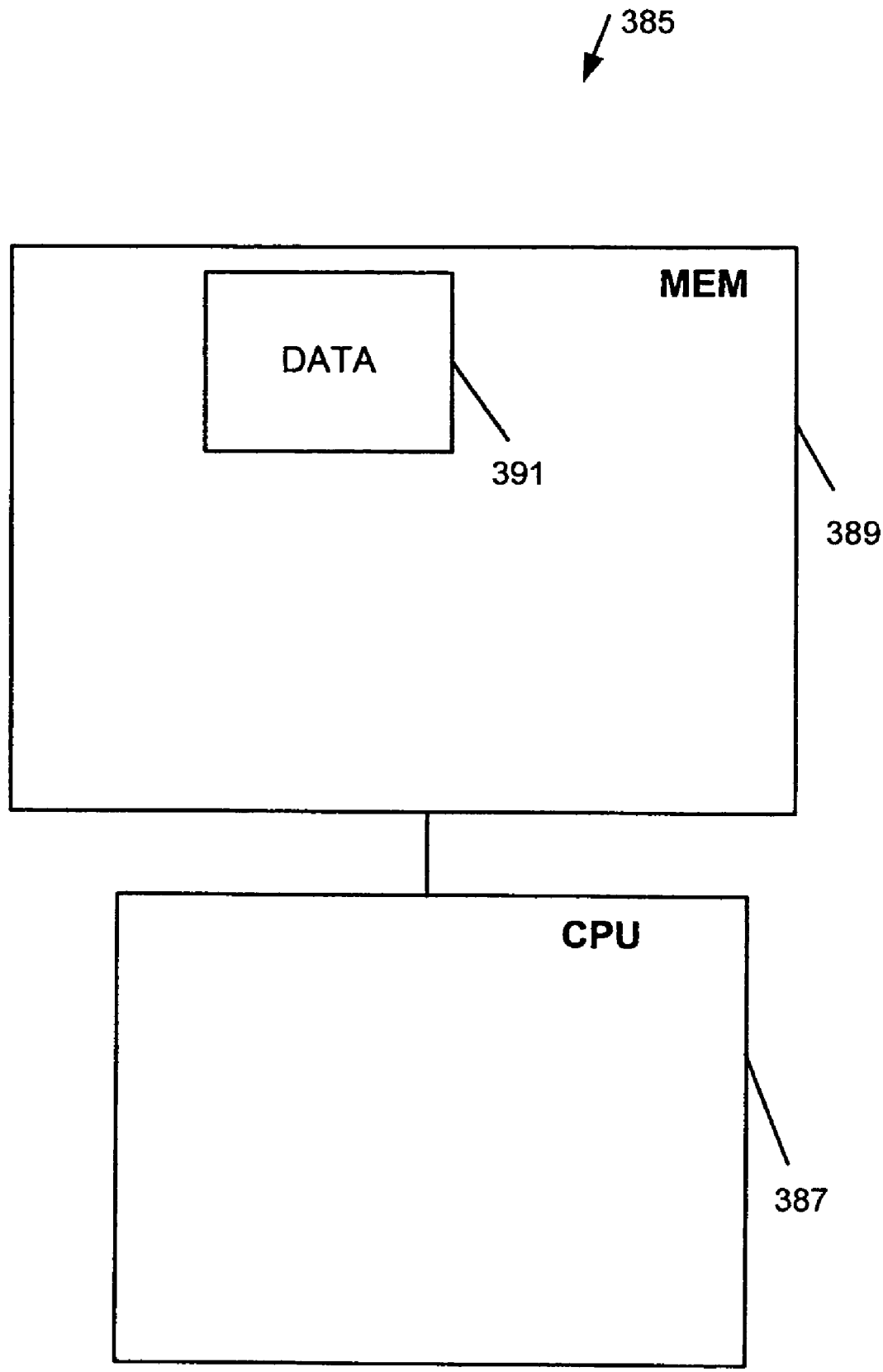
FIG. 3 is a block diagram of an article according to various embodiments of the invention.

For example, FIG. 3 is a block diagram of an article 385 according to various embodiments of the invention. Examples of such embodiments may comprise a computer, a memory system, a magnetic or optical disk, some other storage device, and/or any type of electronic device or system. The article 385 may include a processor 387 coupled to a machine-accessible medium such as a memory 389 (e.g., a memory including an electrical, optical, or electromagnetic conductor) having associated information 391 (e.g., computer program instructions and/or data), which, when accessed, results in a machine (e.g., the processor 387) performing such actions as delaying a pilot carrier signal according to a delay period to create a delayed pilot carrier signal. As previously mentioned, the delay period may include a period of approximately one millisecond, among others.

Other activities may include summing the pilot carrier signal and the delayed pilot carrier signal to create a summed pilot carrier signal, and/or distinguishing the pilot carrier signal included in a plurality of pilot carrier signals based upon a variance in a peak-to-peak amplitude of the summed pilot carrier signal. A pilot carrier signal so distinguished may comprise a spectral component of a digital television signal, including a high definition television (HDTV) signal.

Implementing the apparatus, systems, and methods disclosed herein may enable a receiver to distinguish between sources of signals transmitted with a pilot carrier, including licensed and unlicensed stations.

The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, including:
    a summation device having a first summation input to receive a pilot carrier signal, a second summation input, and a summation output;
    a delay line to receive the pilot carrier signal and to be coupled to the second summation input to delay the pilot carrier signal by a delay period; and
    a discriminator to couple to the summation output, the discriminator including a processor and a memory, wherein the discriminator is configured to provide an indication of whether the pilot carrier signal was sent from a licensed or unlicensed station based on the summation output.

2. The apparatus of claim 1, further including: a phase-locked loop coupled to the delay line and to the pilot carrier signal to select the delay period to approximately match an integral multiple of a reciprocal of a pilot carrier frequency.

3. The apparatus of claim 1, further including: a pilot carrier filter coupled to the summation device and to the delay line to filter the pilot carrier signal.

4. The apparatus of claim 3, further including: a radio frequency receiver coupled to the pilot carrier filter to supply the pilot carrier signal.

5. A system, including:
    a summation device having a first summation input to receive a pilot carrier signal, a second summation input, and a summation output;
    a delay line to receive the pilot carrier signal and to be coupled to the second summation input to delay the pilot carrier signal by a delay period;
    a discriminator to couple to the summation output, the discriminator including a processor and a memory, wherein the discriminator is configured to provide an indication of whether the pilot carrier signal was sent from a licensed or unlicensed station based on the summation output;
    a receiver to provide the pilot carrier signal; and
    a display coupled to the discriminator to display the indication.

6. The system of claim 5, further including: a transmitter to transmit a periodically phase-inverted pilot carrier signal to the receiver.

7. The system of claim 6, further including: a phase inversion device coupled to the transmitter to periodically invert a phase of the phase-inverted pilot carrier signal according to a periodicity of phase inversion.

8. The system of claim 7, further including: a clock coupled to the phase inversion device to determine a periodicity of phase inversion.

9. The system of claim 5, further including: a second transmitter coupled to the receiver to transmit a non phase-inverted pilot carrier signal.

10. A method, including:
    delaying a pilot carrier signal according to a delay period to create a delayed pilot carrier signal;
    summing the pilot carrier signal and the delayed pilot carrier signal to create a summed pilot carrier signal; and
    determining whether the pilot carrier signal was sent from a licensed or unlicensed station based upon a variance in a peak-to-peak amplitude of the summed pilot carrier signal.

11. The method of claim 10, further including: periodically phase-inverting a non phase-inverted pilot carrier signal according to a periodicity of phase inversion to create the pilot carrier signal.

12. The method of claim 11, wherein the periodicity of phase inversion comprises one of an approximate integral multiple of the delay period and an approximate integral factor of the delay period.

13. The method of claim 10, further including: measuring the peak-to-peak amplitude of the summed pilot carrier signal at least once during a period of measurement not greater than a periodicity of phase inversion.

14. The method of claim 10, further including: associating a licensed pilot carrier signal with the summed pilot carrier signal when the summed pilot carrier signal has an approximately constant peak-to-peak magnitude.

15. The method of claim 10, further including: associating an unlicensed pilot carrier signal with the summed pilot carrier signal when the summed pilot carrier signal has a substantially bi-level peak-to-peak magnitude.

16. The method of claim 10, further including: associating a first unlicensed pilot carrier signal when the summed pilot carrier signal has a substantially bi-level peak-to-peak magnitude of a first bi-level periodicity; and associating a second unlicensed pilot carrier signal when the summed pilot carrier signal has a substantially bi-level peak-to-peak magnitude of a second bi-level periodicity.

17. The method of claim 10, further including: receiving the pilot carrier signal as RF energy.

* * * * *